United States Patent [19]

Schreckenberg et al.

[11] 4,333,809

[45] Jun. 8, 1982

[54] CROSS-LINKABLE POLYCARBONATE ELASTOMERS, A PROCESS FOR THEIR PREPARATION AND USE FOR PACKAGING MEDICINES

[75] Inventors: Manfred Schreckenberg; Dieter Freitag, both of Krefeld; Hans-Heribert Burgdörfer, Cologne, all of Fed. Rep. of Germany; Günther Lehnert, Emeryville, Calif.; Siegfried Adelmann; Hans Rudolph, both of Krefeld, Fed. Rep. of Germany

[73] Assignee: Bayer Aktiengesellschaft, Leverkusen, Fed. Rep. of Germany

[21] Appl. No.: 170,439

[22] Filed: Jul. 22, 1980

[30] Foreign Application Priority Data

Jul. 28, 1979 [DE] Fed. Rep. of Germany ....... 2930787

[51] Int. Cl.$^3$ .......................... C08G 63/62; C08J 3/28
[52] U.S. Cl. .............................. 204/159.14; 525/147; 528/29; 528/127; 528/128
[58] Field of Search .................... 528/127, 128, 29; 204/159.14; 525/147

[56] References Cited

U.S. PATENT DOCUMENTS

| | | | |
|---|---|---|---|
| 3,030,335 | 4/1962 | Goldberg | 260/47 |
| 3,161,615 | 12/1964 | Goldberg | 260/47 |
| 3,189,662 | 6/1965 | Vaughn | 260/824 |
| 3,287,442 | 11/1966 | Caldwell et al. | 260/858 |
| 3,518,175 | 6/1970 | Bell | 204/159.19 |
| 4,169,868 | 10/1979 | Schrenckenberg et al. | 525/439 |
| 4,191,705 | 3/1980 | Lindner et al. | 260/483 |
| 4,196,276 | 4/1980 | Schrenckenberg et al. | 528/176 |
| 4,199,540 | 4/1980 | Adelmann et al. | 264/22 |
| 4,216,298 | 8/1980 | Schreckenberg et al. | 525/439 |
| 4,217,297 | 8/1980 | Lindner et al. | 260/463 |
| 4,217,437 | 8/1980 | Schreckenberg et al. | 528/171 |
| 4,221,645 | 9/1980 | Adelmann et al. | 204/159.14 |
| 4,230,548 | 10/1980 | Adelmann et al. | 204/159.14 |

FOREIGN PATENT DOCUMENTS

| | | |
|---|---|---|
| 2619831 | 11/1977 | Fed. Rep. of Germany . |
| 2636784 | 2/1978 | Fed. Rep. of Germany . |
| 2650533 | 5/1978 | Fed. Rep. of Germany . |
| 2702626 | 7/1978 | Fed. Rep. of Germany . |
| 2712435 | 9/1978 | Fed. Rep. of Germany . |
| 2726376 | of 0000 | Fed. Rep. of Germany . |
| 2726416 | 12/1978 | Fed. Rep. of Germany . |
| 2726417 | 12/1978 | Fed. Rep. of Germany . |
| 2746140 | 4/1979 | Fed. Rep. of Germany . |
| 2746141 | 4/1979 | Fed. Rep. of Germany . |
| 2827325 | 10/1980 | Fed. Rep. of Germany . |
| 2829256 | 1/1980 | Fed. Rep. of Germany . |
| 2829258 | 1/1980 | Fed. Rep. of Germany . |
| 2829259 | 1/1980 | Fed. Rep. of Germany . |
| 2837526 | 3/1980 | Fed. Rep. of Germany . |
| 2842004 | 4/1980 | Fed. Rep. of Germany . |
| 965085 | 7/1964 | United Kingdom . |

*Primary Examiner*—Earl A. Nielsen
*Attorney, Agent, or Firm*—Gene Harsh; Lawrence S. Pope; Aron Preis

[57] ABSTRACT

The present invention is directed to cross-linkable, thermoplastically processable, segmented, high molecular weight polycarbonate elastomers, to the process for their preparation and to their use in their cross-linked form.

14 Claims, No Drawings

CROSS-LINKABLE POLYCARBONATE ELASTOMERS, A PROCESS FOR THEIR PREPARATION AND USE FOR PACKAGING MEDICINES

BACKGROUND OF THE INVENTION

High molecular, thermoplastically processable polycarbonate elastomers based on "soft segments" and diphenols and their preparation are known (see, for example, U.S. Pat. No. 3,161,615; U.S. Pat. No. 3,030,335; U.S. Pat. No. 3,287,442; U.S. Pat. No. 3,189,662; German Auslegeschrift No. 1,162,559; German Offenlegschrift No. 2,636,783; German Offenlegungschrift No. 2,702,626; German Offenlegungschrift No. 2,619,831; German Offenlegungschrift No. 2,636,784; German Offenlegungschrift No. 2,650,533; German Offenlegungschrift No. 2,726,416; German Offenlegungschrift No. 2,651,639; German Offenlegungschrift No. 2,726,376; German Offenlegungschrift No. 2,712,435; German Offenlegungschrift No. 2,726,417; German Patent Application No. P 28 27 325.8 and German Patent Application P 28 37 526.0).

The products are thermoplastically processable and have a high degree of elasticity. The elasticity of these products depends on the relative proportions of hard and soft segments; the elasticity and elongation at break increasing with an increasing proportion of soft segments. These products also have a relatively high heat distortion temperature due to regions of crystalline aromatic polycarbonate which impart to the polymer a high density of physical cross-linking. The disadvantage of almost all these products is that the aromatic polycarbonate segments which give the polymer its high heat distortion temperature by physical cross-linking do not recrystallize rapidly enough after thermoplastic processing, resulting in that the polycarbonate elastomer products tend to stick to each other.

This tackiness could hitherto be eliminated only by expensive processing methods such as, for example, by heat treatment or by drawing and heat treatment (see German Offenlegungsschrift No. 2,636,784 and German Offenlegungsschrift No. B 2,636,783, after the thermoplastic processing. The production of nontacky products thus have been associated with a considerable expenditure of work.

The irradiation of aromatic polycarbonates containing aromatic keto groups is described in German Patent Application Nos. P 27 46 141.2 and P 28 29 256.0. (For the irradiation of aromatic polycarbonates, see also German Offenlegungschriften Nos. 2,746,139 and 2,746,140 and German Patent Application Nos. P 28 29 258.2; P 28 29 257.1; P 28 29 259.3 and P 28 42 004.4. However, in contrast to the cross-linkable polycarbonate elastomers according to the present invention, these cross-linkable aromatic polycarbonates contain no soft segments and no "tackiness" is associated with their processing. It could, therefore, not be predicted that by irradiating the polycarbonate elastomers according to the invention, the tackiness disappears without causing the elastomers to embrittle and/or to lose their transparency.

The polycarbonate elastomers according to the invention can be irradiated after processing and the tackiness of moldings, films, etc. of the cross-linkable polycarbonate elastomers can thus be eliminated in a simple manner.

In the field of packaging of medicines, films are used which must be sterilized by steam at 121° C. without exhibiting distortion. The cross-linking according to the invention of the polycarbonate elastomers obtainable according to the invention produces films which fulfill these requirements and, compared with films of corresponding noncross-linked polycarbonate elastomers, have a significantly higher heat distortion temperature.

The packaging materials hitherto used for biological liquids and parenteral agents consisted of polyvinyl chloride containing a high proportion of plasticizer. Such packaging materials have certain disadvantages caused by the high plasticizer content and by the impurities present in PVC; on prolonged use, this is particularly troublesome from a medical point of view.

In contrast, the use according to the invention of the segmented cross-linked polycarbonate elastomers as packaging materials is free of the above-mentioned disadvantages, and feature high mechanical strength, extremely low contents of processing auxiliaries, outstanding transparency and physiological inertness.

In the field of packaging of medicines, glass containers, in particular bottles, have been replaced to an increasing extent by bottles made of thermoplastics, in particular polypropylene, polyethylene and polyethylene terephthalate. All these "rigid" containers have the fundamental disadvantage that upon removal of their contents, they must be aerated under sterile conditions so that the vacuum unavoidably formed can be removed without evaporation of the biological liquids and parenteral agents.

By contrast, aeration is not necessary when emptying containers made of packaging materials obtained from the segmented cross-linked polycarbonate elastomers of the present invention.

The packaging materials obtained from the segmented cross-linked polycarbonate elastomers are outstandingly suitable for packaging and storing biological liquids such as blood, blood plasma or protein fractions as well as for storing infusion liquids or other parenteral agents.

SUMMARY OF THE INVENTION

The present invention relates to a process for the preparation of high molecular, segmented, cross-linkable, thermoplastically processable polycarbonate elastomers by the known polycarbonate preparation processes from "soft segments" which are capable of being incorporated and diphenols, characterized in that aromatic hydroxyketones comprising up to 20 mol percent of the amount of diphenols are co-condensed therein.

The present invention also relates to the cross-linkable polycarbonate elastomers obtainable by the process according to the invention.

The present invention further relates to a process for cross-linking the polycarbonate elastomers obtainable according to the invention, to the cross-linked product and its use as packaging materials for biological liquids and parenteral agents.

DETAILED DESCRIPTION OF THE INVENTION

In the context of the present invention, "soft segments" which are capable of being incorporated are, in particular, "aliphatic soft segments", for example segments of aliphatic polyesters, aliphatic polyethers, aliphatic polythioethers, aliphatic polyacetals, aliphatic polycarbonates, C—C linked polymers and polysiloxanes.

In the context of the present invention, aliphatic soft segments which are capable of being incorporated are those which also react with diphenols and phosgene under the conditions of polycarbonate preparation in a heterogeneous phase system (two-phase boundary process) or homogeneous phase system (pyridine process) to build up high molecular polycarbonates. The soft segments which are capable of being incorporated can contain either carboxyl end groups, according to German Offenlegungsschrift No. 2,636,783 and German Offenlegungsschrift No. 2,702,626, or phenolic end groups, according to German Offenlegungsschrift No. 2,636,784, German Offenlegungsschrift No. 2,726,416, German Offenlegungsschrift No. 2,726,376, German Offenlegungsschrift No. 2,726,417, German Patent Application No. P 28 27 325.8 and German Patent Application No. P 28 37 526.0.

The soft segments which are capable of being incorporated can also contain aliphatic hydroxyl groups which can be incorporated either directly by the process in a homogeneous phase system (see, for example, Journal of Polymer Science, Part C, Polymer Symposia, No. 4 (1963), page 1 and pages 707–730) or via conversion into the corresponding bis-chloroformic acid esters (see, for example, German Auslegeschrift No. 1,162,559).

Suitable soft segments which can be incorporated—polyesters, polyethers, polythioethers, polyacetals and aliphatic polycarbonates which contain carboxyl groups—are prepared as described in German Offenlegungsschrift No. 2,636,783 and have an average molecular weight ($M_n$) greater than 600, preferably greater than 800 and, in particular, between 1,000 and 20,000.

Further suitable soft segments are C—C linked polymers which contain carboxyl groups such as polybutadienes, polyisoprenes, butadiene/acrylonitrile copolymers, butadiene/styrene copolymers, butadiene/allyl alcohol copolymers, ethyl acrylate/butadiene copolymers, ethyl acrylate/isoprene copolymers, n-butyl acrylate/isoprene/acrylonitrile terpolymers and butyl acrylate/chloroprene copolymers such as are described in German Offenlegungsschrift No. 2,702,626 containing carboxyl groups and having a number average molecular weight ($M_n$) of 600, preferably 800 and, in particular, between 1,000 and 20,000.

The carboxylic acid halides of these soft segments containing carboxylic end groups are also suitable.

A soft segment containing carboxylic acid chloride end groups can be prepared with chlorinating agents, for example thionyl chloride, $PCl_3$, $PCl_5$, etc.

Further suitable soft segments which can be incorporated are thus polyethers which contain phenolic hydroxyl end groups with number average molecular weights of the soft segment ($M_n$) greater than 135, preferably over 300, according to German Offenlegungsschrift No. 2,636,784; polyethers which are optionally lengthened via carbonate groups with a $M_n$ of the soft segment of over 135, preferably over 800, according to German Offenlegungsschrift No. 2,726,416; polyesters containing phenolic hydroxyl end groups with number average molecular weights of the soft segment ($M_n$) of over 250, preferably over 600, according to German Offenlegungsschrift No. 2,726,376; polyesters optionally lengthened via carbonate groups with a $M_n$ of the soft segment of over 250, preferably over 600, according to German Offenlegungsschrift No. 2,726,417; aliphatic polycarbonates containing phenolic hydroxyl end groups with a $M_n$ of the soft segment of 300 to 10,000, according to German Patent Application No. P 28 27 325.8; and polythioethers and polyacetals containing phenolic hydroxyl end groups with a $M_n$ of the soft segment of 300 to 6,000, preferably 500 to 4,000, according to German Patent Application No. P 28 37 526.0.

Suitable soft segments with aliphatic hydroxyl end groups are polyester-diols, polyether-diols, polythioether-diols, polyacetal-diols and polyorganosiloxane-diols with average molecular weights $M_n$ of 300–6,000 and aliphatic polycarbonate-diols such as are described, for example, in German Offenlegungsschrift No. 2,636,783 for the preparation of polycarbonates which have carboxyl end groups and a $M_n$ of 300–6,000.

Soft segments which can be incorporated and contain chloroformic acid ester groups are obtained from the above-mentioned segments containing aliphatic hydroxyl end groups with phosgene in a known manner (see German Auslegeschrift No. 1,162,559).

Further soft segments which can be incorporated are organopolysiloxanes such as are described, for example, in U.S. Pat. No. 3,189,662 and German Offenlegungsschrift No. 2,411,123 for the preparation of organopolysiloxane/polycarbonate block copolymers by reaction of an organopolysiloxane containing halogen end groups with a diphenol using acid acceptors and subsequent reaction of the resulting organopolyisoloxane containing phenolic end groups with additional diphenol and phosgene, in a homogeneous phase system or heterogeneous phase system.

Examples of aliphatic soft segments which can be incorporated are:

(a) Aliphatic polycarbonate segments which are prepared from glycols such as 1,3-propanediol; 1,4-butanediol; 1,5-pentanediol; 3-methylpentane-1,5-diol; trimethylhexane-1,6-diol; 1,6-hexanediol; 1,12-dodecanediol; 1,12-octadecanediol; diethylene glycol; triethylene glycol and higher homologues thereof; dipropylene glycol; tripropylene glycol and neopentyl glycol, by reaction with diethyl carbonate or diphenyl carbonate or by reaction with phosgene, by known processes, and which have a $M_n$ of 300 to 6,000.

(b) Examples of polyester segments which are suitable according to the invention are reaction products of dihydric alcohols with dibasic carboxylic acids. Instead of free polycarboxylic acids, it is also possible to use the corresponding polycarboxylic acid anhydrides or corresponding polycarboxylic acid esters of lower alcohols, or mixtures thereof, for the preparation of polyester-polyols. The polycarboxylic acids can be aliphatic, cycloaliphatic, aromatic and/or heterocyclic in nature and can optionally be substituted, for example by halogen atoms, and/or unsaturated. Examples of acids and anhydrides are: oxalic acid, malonic acid, succinic acid, adipic acid, azelaic acid, sebacic acid, phthalic acid, isophthalic acid, terephthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid and dimeric fatty acids, optionally as mixtures with monomeric fatty acids. Examples of possible dihydric alcohols are ethylene glycol; 1,2- and 1,3-propylene glycol; 1,2-, 2,3-, 1,3- and 1,4-butanediol; pentanediols; neopentyl glycol; hexanediols, for example 1,6-hexanediol; trimethylhexanediols; octanediols; decanediols;

dodecanediols; octadecanediols; 2,2-dimethyl-1,3-propanediol; 2,2-dimethyl-3-hydroxypropionate; diethylene glycol; triethylene glycol; tetraethylene glycol; dipropylene glycol; tripropylene glycol; tetrapropylene glycol; 1,4-cyclohexanedimethanol; 1,1-cyclohexanedimethanol; perhydrobisphenols, for example 4,4′-(1-methylethylidene)-bis-cyclohexanol; 2,2-bis-(4-(2-hydroxyethoxy)-phenyl)-propane; glycerol; 1,1,4-butanetriol; trimethylolethane; trimethylolpropane; trimethylolbutane; pentaerythritol; tetroses; di- and trimethylolpropane; pentoses; 2,2,6,6-tetrakis-(hydroxymethyl)-cyclohexanol; hexoses; dipentaerythritol; tripentaerythritol and adducts of ethylene oxide or propylene oxide and such polyols, as long as the average number of carbon atoms per molecule does not exceed 60, polyethylene glycols, polypropylene glycols and polybutylene glycols or mixtures thereof.

Polyesters which are obtained from aliphatic starting components and have a $M_n$ of 300 to 6,000 are preferred.

Examples of polyester segments in the context of the invention are also those which are prepared by polymerization of a lactone, for example ε-caprolactone, or by condensation of a hydroxycarboxylic acid, for example ω-hydroxycaproic acid, onto a starter compound containing hydroxyl groups, and which have a $M_n$ of 300–6,000.

(c) Examples of polyether segments which are suitable according to the invention are those of the following formula (1)

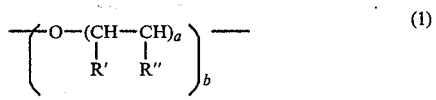

wherein

R′ and R″, independently of one another, are H or $C_1$-$C_4$-alkyl, a is an integer from 1 to 6 and b is an integer from 3 to 140, in particular from 3 to 90.

Examples of these segments are poly-(ethylene oxide) segments, poly-(1,2-propylene oxide) segments, poly-(1,3-propylene oxide) segments, poly-(1,2-butylene oxide) segments, poly-(tetrahydrofurane) segments, the corresponding poly-(pentylene oxide) segments, poly-(hexamethylene oxide) segments, poly-(heptamethylene oxide) segments, poly-(octamethylene oxide) segments, poly-(nonamethylene oxide) segments and copolymers or block copolymers of, for example, ethylene oxide and propylene oxide.

(d) Examples of polythioether segments which are suitable according to the invention are those which are prepared by acid condensation of thiodiglycol with itself or with other diols such as, for example, 1,6-hexanediol, and which have a $M_n$ of 300–6,000.

(e) Exaples of polyacetal segments which are suitable according to the invention are those which are prepared by acid condensation of diols such as, for example, diethylene glycol, triethylene glycol, 1,6-butanediol or 1,6-hexanediol, with aliphatic aldehydes such as, for example, formaldehyde or acetaldehyde, and which have a $M_n$ of 300–6,000.

(f) Examples of organopolysiloxane segments which are suitable according to the invention are those of the following formula (2)

Examples of the radicals R‴ in formula (2) are aliphatic, cycloaliphatic and armatic halogen-substituted radicals such as alkyl, alkenyl, cycloalkyl and halogenoalkyl, including methyl, ethyl, propyl, chlorobutyl etc., cyanoalkyl radicals such as cyanoethyl, cyanobutyl etc., aryl radicals and halogen-substituted aryl radicals such as phenyl, chlorophenyl, xylyl, tolyl etc., and aralkyl radicals such as phenylethyl, benzyl etc., it being possible for the symbols R‴ in the molecule to be identical or different, and R‴ preferably being methyl. r is preferably a number from 5 up to and including 200 and preferably from 15 up to and including 90.

Particularly preferred soft segments are aliphatic polycarbonates, polyesters, polyethers and organopolysiloxanes.

The above-mentioned soft segments according to (a) to (f) can be used via their aliphatic hydroxyl groups after conversion into corresponding bischlorocarbonates or after conversion into the corresponding soft segments with diphenolcarbonate end groups or purely phenolic end groups.

All diphenols are suitable for the preparation of the high molecular, cross-linkable polycarbonate elastomers according to the invention, examples being hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-sulphoxides, bis-(hydroxyphenyl-sulphones and α,α-bis-(hydroxyphenyl)-diisopropylbenzenes, and derivatives thereof which are alkylated or halogenated in the nucleus. These and other suitable aromatic dihydroxy compounds are listed, for example, in U.S. Pat. Nos. 3,028,365; 2,999,835; 3,148,172; 2,991,273; 2,271,367 and 2,999,846, and in German Offenlegungsschriften Nos. 2,063,050 and 2,211,957.

Diphenols which can be used according to the invention are, in particular, those of the formula (3)

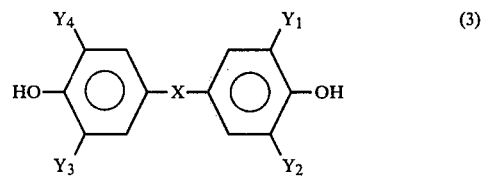

wherein

X is a single bond,

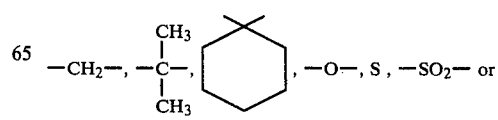

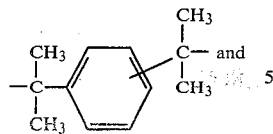

$Y_1$ to $Y_4$ are identical or different and denote H, $C_1$–$C_4$ alkyl, such as methyl, or halogen, such as chlorine or bromine.

Examples of suitable diphenols are 4,4′-dihydroxydiphenyl; 2,2-bis-(4-hyroxyphenyl)-propane, 2,4-bis-(4-hydroxy-phenyl)-2-methylbutane; 1,1-bis-(4-hydroxyphenyl)-cyclohexane; α,α-bis-(4-hydroxyphenyl)-p-diisopropylbenzene; 2,2-bis-(3-methyl-4-hydroxyphenyl)-propane; 2,2-bis-(3-chloro-4-hydroxyphenyl)-propane; bis-(3,5-dimethyl-4-hydroxyphenyl)-methane; 2,2-bis-(3,5-dimethyl-4-hydroxyphenyl)-propane; bis-(3,5-dimethyl-4-hydroxyphenyl)-sulphone; 2,4-bis-(3,5-dimethyl-4-hydroxyphenyl)-2-methylbutane; 1,1-bis-(3,5-dimethyl-4-hydroxyphenyl)-cyclohexane; α,α′-bis-(3,5-dimethyl-4-hydroxyphenyl)-p-diisopropylbenzene; 2,2-bis-(3,5-dichloro-4-hydroxyphenyl)-propane and 2,2-bis-(3,5-dibromo-4-hydroxyphenyl)-propane.

Examples of preferred diphenols are 2,2-bis-(4-hydroxyphenyl)-propane; 1,1-bis-(4-hydroxyphenyl)-cyclohexane; 2,2-bis-(3,5-dichloro-4-hydroxyphenyl)-propane; 2,2-bis-(3,5-dibromo-4-hydroxyphenyl)-propane; 2,2-bis-(3,5-dimethyl-4-hydroxyphenyl)-propane; bis-(3,5-dimethyl-4-hydroxyphenyl)-methane and bis-(4-hydroxyphenyl)-sulphide.

Either one or several of the diphenols which are suitable according to the invention can be used.

Aromatic hydroxyketones which are suitable according to the invention are aromatic monohydroxyketones, preferably those of the formula (4) (4a and 4b).

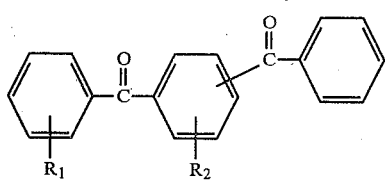
(4a)

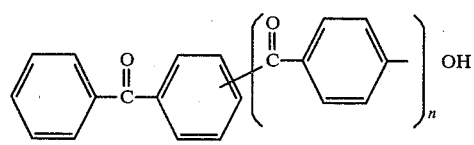
(4b)

wherein
$R_1$ or $R_2$ is OH,
n denotes zero or 1, and
$R_1$ and $R_2$ can be either OH or H.

Further aromatic hydroxyketones which are suitable according to the invention are aromatic dihydroxyketones, preferably those of the following formula (5) (5a, 5b, and 5c)

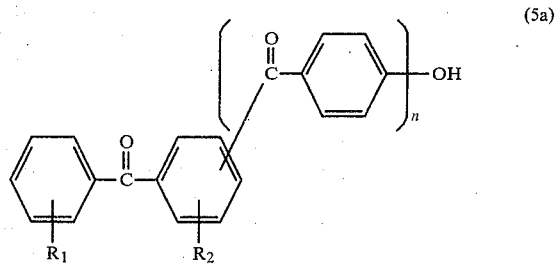
(5a)

In (5a),
$R_1$ or $R_2$ is OH,
n is zero or 1, and
$R_1$ and $R_2$ can be either OH or H.

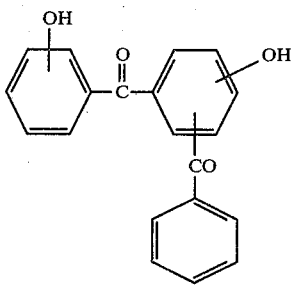
(5b)

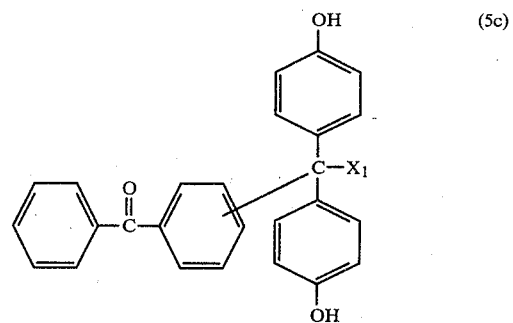
(5c)

In (5c), $X_1$ can be $C_1$–$C_6$ alkyl or phenyl.

Further aromatic hydroxyketones which are suitable according to the invention are aromatic trihydroxyketones or aromatic tetrahydroxyketones, preferably those of the following formula (6) (6a and 6b)

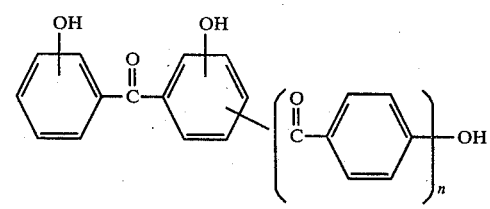
(6a)

In (6a), n is zero or 1.

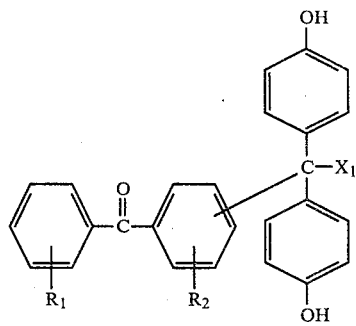

In (6b),
R₁ or R₂, or R₁ and R₂ are OH, and
R₁ and R₂ can be either OH or H and
X₁ can be $C_1$–$C_6$-alkyl or phenyl.

Aromatic mono-, di-, tri- and tetrahydroxyketones are to be understood as those compounds which contain aromatically bonded carbonyl, as well as the appropriate number of aromatically bonded hydroxyl groups. It is also possible for the ketones to be mixed aromatic-aliphatic as well as aromatic-aromatic. In the case of the monohydroxyketones, they are employed in the preparation of the high molecular, cross-linkable polycarbonate elastomers according to the invention as chain stoppers in the customary amounts of between 0.5 and 10 mol %, in each case relative to the total molar amount of diphenols to be employed, other phenolic chain stoppers also being used if appropriate.

In the case of the dihydroxyketones, they are used as comonomeric diphenols, together with any of the other diphenols to be used for the preparation of the high molecular, cross-linkable polycarbonate elastomers, in amounts of between 1 and 20 mol %, in each case relative to the total molar amount of diphenols to be employed.

In the case of the trihydroxyketones and tetrahydroxyketones, they are used in the preparation of the high molecular, cross-linkable polycarbonate elastomers according to the invention as branching agents in the customary amounts of between 0.3 and 3 mol %, in each case relative to the total molar amount of diphenols to be employed, other customary branching agents may also be used if appropriate.

According to the invention, the total molar amount of aromatic hydroxyketones (monohydroxyketones and polyhydroxyketones) to be employed is in each case between 1 and 20 mol %, preferably between 2 and 15 mol % and in particular between 3 and 10 mol %, in each case relative to the total molar amount of diphenols to be employed in the total aromatic polycarbonate constituent of the polycarbonate elastomers.

Examples of aromatic hydroxyketones which can be used according to the invention are 4-hydroxybenzophenone; 2-hydroxybenzophenone; 4,4'-dihydroxybenzophenone; 2,4-dihydroxybenzophenone; 4-(α,α-bis-(4-hydroxyphenyl)-ethyl)-benzophenone; 4-(α,α-bis-(4-hydroxyphenyl)-benzyl)-benzophenone; 4-hydroxybenzoylbenzophenone; 2-hydroxy-4-methoxybenzophenone; 2,4-dihydroxyacetophenone; 2,5-dihydroxyacetophenone; 2,6-dihydroxyacetophenone; 4-hydroxyacetophenone and others.

Particularly suitable aromatic hydroxyketones are 2,4-dihydroxybenzophenone; 4,4'-dihydroxybenzophenone; 4-(α,α-bis-(4-hydroxyphenyl)-ethyl)-benzophenone and 2-hydroxy-4-methoxybenzophenone.

Independently of the aromatic trihydroxyketones or aromatic tetrahydroxyketones which can be used according to the invention, the known branching agents with three or more functional groups, in particular those with three or more phenolic hydroxyl groups, can be used for the preparation of the modified polycarbonates according to the invention in the usual known amounts of branching agents of between 0.05 and 2 mol % relative to incorporated diphenols. The preparation of branched polycarbonates is described, for example, in German Offenlegungsschrift No. 1,570,533, German Offenlegungsschrift No. 1,595,762, U.S. Pat. No. 3,544,514 and U.S. Pat. No. Re. 27,682.

Chain stoppers which can be used, in addition to the monohydroxyketones which can be employed according to the invention, for example 2-hydroxy-4-methoxybenzophenone, are the phenols customarily used such as p-tert.-butylphenol; p-chlorophenol; 2,4,6-tribromophenol and phenol itself, in the usual amounts, which are determined by the molecular weight to be established in the high molecular, cross-linkable polycarbonate elastomers according to the invention.

The preparation, according to the invention, of the cross-linkable polycarbonate elastomers by the preparation processes described below is essentially quantitative so that the particular reactant ratio of soft segment to diphenol to aromatic hydroxyketones including, if appropriate, chain stoppers and chain branching agents, determines the particular composition of the cross-linkable polycarbonate elastomer or is determined by the desired composition of the cross-linkable polycarbonate elastomer.

The polycarbonate elastomers according to the invention can be prepared in a homogeneous phase system by the so-called pyridine process (see, for example, U.S. Pat. Nos. 3,161,615, 3,030,335, 3,189,662 and 3,287,442) by the so-called suspension (see German Offenlegungsschrift No. 1,495,906 and U.S. Pat. No. 3,290,409) by the phase boundary process via chlorocarbonates of soft segments according to German Auslegeschrift No. 1,162,559, with the aid of soft segments containing carboxyl end groups, according to German Offenlegungsschrift No. 2,636,783 and German Offenlegungsschrift No. 2,702,626, and with the aid of soft segments with diphenolcarbonate end groups, according to German Offenlegungsschrift No. 2,636,784, German Offenlegungsschrift No. 2,726,376, German Offenlegungsschrift No. 2,726,416 and German Offenlengungsschrift No. 2,726,417, and according to German Patent Applications Nos. P 28 27 325.8 and P 28 37 526.0.

The preparation of the high molecular, cross-linkable polycarbonate elastomers according to the invention can essentially be effected by the following modification to the two known processes (compare H. Schnell, Chemistry and Physics of Polycarbonates, Polymer Rev., Volume IX, page 27 et seq., Interscience Publishers) described briefly below. 1. Preparation of a polycarbonate elastomer in a heterogeneous phase system (phase boundary process)

In this process, the diphenols are dissolved in an aqueous alkaline phase, together with the aromatic hydroxyketones, trifunctional or tetrafunctional branching agents and the monophenolic chain stoppers. After adding the soft segment, containing carboxyl end groups or phenolic hydroxyl end groups, as a solution in a solvent suitable for polycarbonate elastomers, a two-phase mixture is formed, into which phosgene is passed at 0° to 60° C. After adding a catalyst, high molecular polycarbonate elastomers are obtained. The product is worked up by separating off the organic phase, washing it until it is neutral and then distilling off the solvent, for example in a twinscrew devolatilization extruder at temperatures of about 200° to 220° C.

Suitable organic solvents for polycarbonate elastomers are those which are known for polycarbonate synthesis such as, for example, methylene chloride, chlorobenzene and mixtures thereof.

Suitable catalysts are those which are known for polycarbonate synthesis such as, for example, triethylamine and tributylamine, N-ethylpiperidine or quaternary ammonium salts such as, for example, tetrabutylammonium bromine and others, and which are described in German Patent Application No. P 29 01 665.7. 2. Preparation of a polycarbonate elastomer in a homogeneous phase system (pyridine process)

The diphenols are dissolved in an organic base such as, for example, pyridine or a mixture of pyridine and methylene chloride together with the aromatic hydroxyketones, trifunctional or tetrafunctional branching agents, the monophenolic chain regulators and the above-mentioned soft segmets. After adding a solvent which is suitable for polycarbonate elastomers, phosgene is passed in at a temperature between 0° and 60° C. The pyridine hydrochloride which forms during the reaction is filtered off and the organic phase is washed with dilute HCl and then with water until neutral. The product is worked up as described under (1), for example, by evaporating off the solvent in a twin-screw devolatilization extruder.

In addition to pyridine, examples of other suitable organic bases are triethylamine and tributylamine. Methylene chloride and chlorobenzene as well as mixtures thereof can be used as solvents for polycarbonate elastomers.

The proportion of aromatic polycarbonate in the high molecular, cross-linkable polycarbonate elastomers prepared by the process according to the invention is between about 30 and 95, preferably about 35 and 80% by weight, depending on the desired properties. The hardness and heat distortion point increase and the elasticity and elongation at break decrease with an increasing proportion of aromatic polycarbonate.

The proportion of aromatic polycarbonate in the high molecular, cross-linkable polycarbonate elastomers according to the invention is to be understood as the amount by weight of aromatic carbonate structural units of the following formula (7)

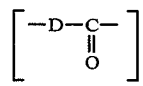
(7)

wherein
D represents the diphenolate radicals in the high molecular polycarbonate,
in particular of aromatic carbonate structural units of the formula (8)

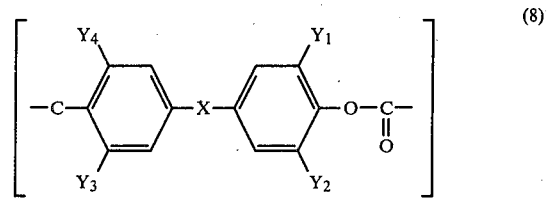

wherein
X and $Y_1$ to $Y_4$ have the meaning given in the case of formula (3),
with the proviso that the amount of carbonate structural units resulting from the aromatic dihydroxyketones is 1 to 20 mol %, in each case relative to carbonate structural units and corresponding diphenolate radicals.

Accordingly, the proportion of soft segments in the high molecular, cross-linkable polycarbonate elastomers according to the invention is to be understood as the amount by weight of aliphatic carbonate structural units (9) and carboxylate structural units (10) obtained from the soft segments which are capable of being incorporated and are suitable according to the invention.

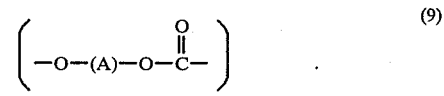
(9)

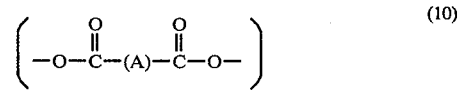
(10)

wherein —O—(A)—O— represents soft segment diolates and the structural unit (10) represents soft segment dicarboxylates.

The present invention thus also relates to high molecular, cross-linkable polycarbonate elastomers which are characterized in that they consist of about 30 to 95% by weight, preferably about 35 to 80% by weight, of aromatic carbonate structural units, preferably those of the formula (7) and about 70 to 5% by weight, preferably about 65 to 20% by weight, of incorporated soft segments, preferably of aliphatic carbonate structural units of the formula (9) and carboxylate structural units of the formula (10).

The high molecular, cross-linkable polycarbonate elastomers according to the invention should have weight average molecular weights ($\overline{M}_W$) of 25,000 to 200,000, preferably of 40,000 to 150,000, measured by the light scattering method using a dispersion photometer. The relative solution viscosities $\eta_{rel}$ (measured on solutions of 0.5 g in 100 ml of $CH_2Cl_2$ at 25° C.) of the high molecular, cross-linkable polycarbonate elastomers according to the invention are between 1.3 and 3.0, preferably between 1.4 and 2.6.

In addition to their particular resistance to heat, the high molecular, segmented thermoplastically processable polycarbonate elastomers according to the invention containing aromatic keto groups have a good transparency and are highly elastic. Their mechanical properties, are outstanding; their tensile strength about 60 MPa; their elongation at break is about 750%; and their tear propagation resistance, measured in accordance with the method of Graves, is about 40 kN/m. These values also apply to the cross-linked material.

The cross-linkable polycarbonate elastomers according to the present invention can contain the customary additives of polycarbonate chemistry such as, for example, hydrolysis stabilizers, flameproofing agents and processing auxiliaries as long as they do not impair the transparency and ease of cross-linking of the polycarbonate elastomers according to the invention.

The radiation required for cross-linking the polycarbonate elastomers according to the invention can be provided by intense sunlight or by commercially available UV lamps, for example Philips HTQ 4 or 7, Hanovia lamps or by sources of other high energy rays, for example electron beams. The irradiation period is from 2 to 60 seconds depending on the content of the aromatic keto groups and on the nature of the sample.

The polycarbonate elastomers obtained after the cross-linking according to the invention, although still elastic and transparent, are also stable vis organic solvents (insoluble in methylene chloride) and, compared with conventional polycarbonate elastomers, are distinguished by the fact that their heat distortion point, ease of sterilization by steam and freedom from tackiness (blocking) are improved.

In addition to their use as packaging materials for biological liquids and parenteral agents, the high molecular, cross-linked polycarbonate elastomers obtained by the process according to the invention can advantageously be used in all cases where a combination of strength and elasticity, especially cold flexibility, is desired, for example in vehicle bodywork construction, for the production of low pressure tires for vehicles, for sheathings for tubes, plates and pipes and for flexible disc pulleys.

The main use of the cross-linked polycarbonate elastomers is the production of packaging materials for biological liquids and parenteral agents.

The first stage of the production of the packaging materials is customary thermoplastic shaping of the cross-linkable polycarbonate elastomers which can be carried out by known processing methods, for example by extrusion.

The resulting films can be made into flexible bags with no difficulties by heat-sealing or heat impulse welding, ultrasonic welding or high frequency welding and the flexible bags can be converted to the ready-to-use end product by irradiation.

If these latter processing measures (heat-sealing etc.) are to be carried out on irradiated films which are no longer thermoplastic, the "stencil technique" should preferably be used during irradiation: the film is clamped in a frame such that all of one side, that is to say, the side which becomes the "outside" during sealing, is exposed to the radiation and only part of the other side is exposed to the radiation. The sealing edge is excluded from the cross-linking.

The unexposed areas can be distinguished from the exposed ones by their slight yellow coloration and can be placed on top of one another for sealing. The coloration disappears, for example, on irradiation with UV light or under the prolonged influence of daylight.

The average molecular weights given in the Examples which follow are number-average $\overline{M}_n$ and are established by determining the OH number.

The relative solution viscosity $\eta_{rel}$ in Examples 1-7 is defined as the viscosity of 0.5 g of the high molecular, cross-linkable polycarbonate elastomer in 100 ml of methylene chloride at 25° C.

The tensile strength and elongation at break were measured in accordance with the method of DIN 53 504.

Investigations by gel chromatography were carried out in tetrahydrofurane using Styragel columns (separation range: $1.5 \times 10^5$Å, $1 \times 10^5$Å, $3 \times 10^4$Å and $2 \times 10^3$Å) at room temperature.

The bisphenol-A polycarbonate standard was used for the determination. No marked deviations in comparison with the $M_w$ determination by the light scattering method were established.

EXAMPLES

Example 1

Preparation of a high molecular, segmented, crosslinkable aliphatic-aromatic polycarbonate elastomer with aromatic keto groups, comprising 55% by weight of 1,6-hexanediol polycarbonate units and 45% by weight of aromatic polycarbonate units.

120.3 g of 2,4-dihydroxybenzophenone, 856.1 g of bisphenol-A and 18 g of p-tert.-butylphenol are dissolved in 1,420 g of 45% strength NaOH and 30 l of distilled water. A solution of 15.3 g of 1,4-bis(4',4''-dihydroxytriphenylmethyl)-benzene in 135 g of 5% strength NaOH is added to this solution. A solution of 3,316 g of a 1,6-hexanediol polycarbonate with diphenol carbonate end groups of bisphenol-A ($M_n$ 2,750) obtained from 2,475 g of 1,6-hexanediol polycarbonate and 841 g of bisphenol-A and bisphenol-A carbonate (prepared according to No. P 28 27 325.8 in 30 l of methylene chloride is added to this reaction mixture. 1,580 g of phosgene are passed in at 20°-25° C. in the course of 40 minutes while stirring and under a nitrogen atmosphere. During the introduction, 3,500 g of 45% strength NaOH are simultaneously added dropwise such that the pH value remains constant at 13. After passing in the phosgene, 8.1 g of triethylamine are added and the mixture is stirred for one hour.

The organic phase is separated off and washed successively with 2% strength phosphoric acid and then with distilled water until free from electrolytes. After separating off the water, the organic solution is concentrated. The high molecular, cross-linkable aliphatic-aromatic polycarbonate elastomer is isolated by extrusion in an evaporation extruder at about 200°-220° C. under the conditions known for polycarbonate extrusion.

The relative viscosity $\eta_{rel}$ of the resulting aliphatic-aromatic polycarbonate is 1.56 (measured in $CH_2Cl_2$ at 25° C. and 5 g/l).

According to the determination by gel chromatography, the polycarbonate elastomer has an average molecular weight $\overline{M}_w$ of 83,000 and $\overline{M}_n$ of 19,000 and a heterogeneity U of 3.37.

The material obtained is in the form of odorless, free-flowing granules which are suitable for further processing, for example extrusion to films. Production and testing of thin films from the polycarbonate elastomer according to the invention.

The granules obtained under Example 1 were drawn to films from (a) methylene chloride solution and (b) tetrahydrofurane solution and (c) extruded at between 185° and 240° C. to give flat films 200 μm thick. Optical measurements on the extruded films showed light transmissions of 89% and cloudiness of only 4%.

Tensile strength: 60 MPa (measured in accordance with the method of DIN 53 504).

Elongation at break: 750% (measured in accordance with the method of DIN 53 504).

Tear propagation resistance, measured in accordance with the method of Graves: 40 kN/m.

Weld strength on heat impulse welding: 25 N/cm.

After irradiation of both sides with UV light for 10 seconds, a sealing edge on one side being protected from the irradiation, flexible bags were made, filled with 1 l of water and subjected to steam sterilization in accordance with the method of DIN 58 946, Part 1, IIe. The bags subsequently passed the drop tests according to DIN E 58 361, Part 4. The films produced with the material according to the invention fulfill the chemical requirements of transfusion containers according to DIN E 58 361, Part 4. Permeability to steam at a thickness of 100 μm: 18 gm$^{-2}$d$^{-1}$.

Example 2

Preparation of a high molecular, segmented, crosslinkable aliphatic-aromatic polycarbonate elastomer with aromatic keto groups, comprising 60% by weight of aromatic polycarbonate units.

3.75 g of 4-(α,α-bis-(4-hydroxyphenyl)-ethyl)benzophenone and 27.95 g of bisphenol-A are dissolved in 53.5 g of 45% strength NaOH and 1,300 g of distilled water. A solution of 0.59 g of 1,4-bis-(4',4'''-dihydroxytriphenyl-methyl)-benzene in 5.22 g of 5% strength NaOH is added to this solution. A solution of 160.7 g of a 1,6-hexanediol polycarbonate with diphenol carbonate end groups of bisphenol-A ($M_n$ 2,750) (prepared according to No. P 28 27 325.8 in 1,725 g of methylene chloride is added to this reaction mixture. 88 g of 45% strength NaOH are simultaneously added dropwise, at pH 13, in the course of 20 minutes. After passing in phosgene, 30 g of a 1% strength triethylamine solution are added and the mixture is stirred for one hour.

The organic phase is worked up as in Example 1. The elastomer is isolated by drying the product phase in a vacuum drying cabinet at 80° C. and under 15 mm Hg.

The relative viscosity $\eta_{rel}$ of the polycarbonate elastomer is 2.1.

Example 3

Preparation of a high molecular, segmented, crosslinkable polycarbonate elastomer with aromatic keto groups, comprising 50% by weight of units of a polyester of hexandiol and adipic acid and 50% by weight of aromatic polycarbonate units.

5.35 g of 2,4-dihydroxybenzophenone and 54.1 g of bisphenol-A are dissolved in 70.2 g of 45% strength NaOH and 1,300 g of distilled water. A solution of 0.76 g of 1,4-bis-(4',4'''-dihydroxytriphenylmethyl)benzene in 6.7 g of 5% strength NaOH is added to this solution. A solution of 130.4 g of a polyester of hexanediol and adipic acid ($M_n$ 2,250) with diphenol carbonate end groups of bisphenol-A ($M_n$ 3,010) (obtained from 100 g of polyester and 30.4 g of bisphenol-A and bisphenol-A carbonate and prepared according to No. P 28 37 526.0 in 1,725 g of methylene chloride is added to this reaction mixture. 78.1 g of phosgene are passed in at 20°–25° C. in the course of 20 minutes while stirring. During the introduction, 120 g of 45% strength NaOH are simultaneously added dropwise at pH 13. After passing in the phosgene, 40 g of a 1% strength triethylamine solution are added and the mixture is stirred for one hour. Working up of the organic phase and isolation of the elastomer are effected as in Example 2. The relative viscosity $\eta_{rel}$ of the polycarbonate elastomer is 1.99.

Example 4

Preparation of a high molecular, segmented, crosslinkable polycarbonate elastomer with aromatic keto groups, comprising 50% by weight of polypropylene ether units and 50% by weight of aromatic polycarbonate units.

5.35 g of 2,4-dihydroxybenzophenone and 60.5 g of bisphenol-A are dissolved in 70.2 g of 45% strength NaOH and 1,300 g of distilled water. A solution of 0.76 g of 1,4-bis-(4',4'''-dihydroxytriphenylmethyl)-benzene and 6.7 g of 5% strength NaOH is added to this solution. A solution of 125 g of a polypropylene ether ($M_n$ 4,000) lengthened via carbonate groups and with diphenol carbonate end groups of bisphenol-A (obtained from 100 g of polypropylene ether and 24 g of bisphenol-A and bisphenol-A carbonate and prepared according to German Offenlegungsschrift No. 2,726,416, in 1,725 g of methylene chloride is added to this reaction mixture. The reaction and working up are effected as in Example 3. The relative viscosity $\eta_{rel}$ of the polycarbonate elastomer is 1.52.

Example 5

Preparation of a high molecular, segmented, crosslinkable polycarbonate elastomer with aromatic keto groups, comprising 50% by weight of units of a polyester of hexanediol, neopentylglycol and adipic acid and 50% by weight of aromatic polycarbonate units.

5.35 g of 2,4-dihydroxybenzophenone and 84.5 g of bisphenol-A are dissolved in 70.2 g of 45% strength NaOH and 1,300 g of distilled water. A solution of 0.51 g of 1,4-bis-(4',4'''-dihydroxytriphenylmethyl)benzene in 4.4 g of 5% strength NaOH is added to this solution. A solution of 100 g of a polyester of hexanediol and neopentylglycol in the ratio 1:2 and adipic acid ($M_n$=3,896) containing carboxyl end groups in 1,725 g of methylene chloride is added to this reaction mixture. 132.5 g of phosgene are passed in at 20°–25° C. in the course of 30 minutes while stirring and under a nitrogen atmosphere. During the introduction, 300 g of 45% strength NaOH are simultaneously added dropwise such that the pH value remains constant at 13. After passing in phosgene, 45.2 g of a 1% strength triethylamine solution are added and the mixture is stirred for one hour.

The organic phase is worked up as in Example 1. The product is isolated by drying the concentrated organic phase in a vacuum drying cabinet at 80° C. and under 15 mm Hg.

The relative viscosity $\eta_{rel}$ of the polycarbonate elastomer is 1.58.

Example 6

Preparation of a segmented, cross-linkagle polycarbonate elastomer with aromatic keto groups, comprising 50% by weight of polydimethylsiloxane structural units and 50% by weight of aromatic structural units.

12.5 g of a dihydroxydimethylpolysiloxane ($M_n$ 1,333) (commercial name: Baysilon OFOH) are dissolved in 170 ml of methylene chloride. 6.5 g of phosgene are passed into this solution at 18°–20° C. in the course of 20 minutes. A solution of 0.67 g of 2,4-dihydroxybenzophenone and 10.55 g of bisphenol-A in 50 ml of 2 N NaOH is added to this mixture while stirring and under a $N_2$ atmosphere. 7.4 g of phosgene are then passed in at 20°–25° C. while stirring. During the introduction, 42 g of 45% strength NaOH are simultaneously added dropwise such that the pH value remains constant at 13. After passing in the phosgene, 6.2 ml of a 1% strength triethylamine solution are added and the mixture is stirred for one hour.

Working up is effected as described in Example 2. The relative viscosity $\eta_{rel}$ of the polycarbonate elastomer is 1.25.

Example 7 (pyridine process)

Preparation of a segmented, cross-linkable polycarbonate elastomer with aromatic keto groups, comprising 55% by weight of 1,6-hexanediol polycarbonate units and 45% by weight of aromatic polycarbonate units.

0.66 g of 2,4-dihydroxybenzophenone and 9.36 g of bisphenol-A are dissolved in 170 ml of pyridine under a $N_2$ atmosphere. A solution of 13.5 g of a 1,6-hexanediol polycarbonate ($M_n$ 2,020) in 170 ml of methylene chloride is added to this solution. 5.1 g of phosgene are now passed into this reaction solution in the course of 20 minutes while stirring. The reaction mixture formed is stirred for a further hour. The pyridine hydrochloride formed during the reaction is then filtered off and the organic phase is washed twice with 10% strength hydrochloric acid. It is then washed with distilled water until free from electrolytes. The product is isolated by drying the concentrated organic phase at 80° C. and under 15 mm Hg. The relative viscosity $\eta_{rel}$ of the polycarbonate elastomer is 1.29.

To test the tackiness (blocking), films of Examples 1–7 were irradiated with a Hanovia high pressure mercury lamp with a radiant power of 80 watts/cm, at a distance of 8 cm, and their tackiness was then determined.

| Example | Film thickness (mm) | Irradiation (seconds) | Tackiness (blocking) |
|---|---|---|---|
| 1 | 0.15 | not exposed | tacky |
|   |   | 2 | slightly tacky |
|   |   | 5 | nontacky |
|   |   | 10 | nontacky |
| 2 | 0.1 | not exposed | tacky |
|   |   | 2 | slightly tacky |
|   |   | 5 | nontacky |
|   |   | 10 | nontacky |
| 3 | 0.16 | not exposed | tacky |
|   |   | 2 | slightly tacky |
|   |   | 5 | nontacky |
|   |   | 10 | nontacky |
| 4 | 0.22 | not exposed | tacky |
|   |   | 2 | slightly tacky |
|   |   | 5 | nontacky |
|   |   | 10 | nontacky |
| 5 | 0.22 | not exposed | tacky |
|   |   | 2 | slightly tacky |
|   |   | 5 | nontacky |
|   |   | 10 | nontacky |
| 7 | 0.22 | not exposed | tacky |
|   |   | 2 | slightly tacky |
|   |   | 5 | still slightly tacky |
|   |   | 10 | nontacky |

What is claimed is:

1. In the process for the preparation of high molecular weight, thermoplastically processable, segmented, cross-linkable polycarbonate elastomers by known polycarbonate preparation processes, in a heterogeneous or a homogeneous solvent phase system, from "soft segments" which are capable of incorporation and from diphenols, the improvement comprising cocondensing aromatic hydroxyketones having the carbonyl and the hydroxyl groups bonded directly to an aromatic ring in amounts of 1 to 20 mol % relative to the molar amount of said diphenols.

2. The process according to claim 1 wherein said aromatic hydroxyketones comprise 2 to 15 mol % relative to the molar amount of said diphenols.

3. The process according to claim 1 wherein said aromatic hydroxyketones comprise 3 to 10 mol % relative to the molar amount of said diphenols.

4. The process according to claim 1 wherein employed are chain terminators.

5. The process according to claim 1 wherein employed are branching agents.

6. The process according to claim 1 wherein said soft segments comprise 5 to 70% by weight of said high molecular weight thermoplastically processable, segmented, cross-linkable polycarbonate elastomer.

7. The cross-linkable polycarbonate elastomer obtained by the process according to claim 1 or 2 or 3 or 4 or 5 or 6.

8. High molecular weight, thermoplastically processable, segmented, cross-linkable polycarbonate elastomers prepared by known processes for the preparation of polycarbonates, in a heterogeneous or a homogeneous solvent phase system, from "soft segments" which are capable of incorporation and from diphenols characterized in having co-condensed therein aromatic hydroxyketones having the carbonyl and the hydroxyl groups bonded directly to an aromatic ring in amounts of 1 to 20 mol % relative to the molar amount of said diphenols.

9. The polycarbonate elastomers of claim 8 wherein said amounts of said aromatic hydroxyketones are between 2 and 15 mol % relative to the molar amount of said diphenols.

10. The polycarbonate elastomers of claim 8 wherein said amounts of said aromatic hydroxyketones are between 3 and 10 mol % relative to the molar amount of said diphenols.

11. The polycarbonate elastomers of claim 8 wherein said soft segments comprise between 5 and 70% of the weight of said elastomers.

12. A process for cross-linking the polycarbonate elastomers of claim 1 or claim 8 by exposure to intense visible light, UV light or high energy radiation.

13. The cross-linked polycarbonate elastomers obtained by the process of claim 12.

14. A process for cross-linking the polycarbonate elastomers of claim 7 by exposure to intense visible light, UV light or high energy radiation.

* * * * *